March 24, 1959
J. CARTON
2,878,674
MEASURING AND DETECTING APPARATUS
Filed Nov. 3, 1953
Fig. 1
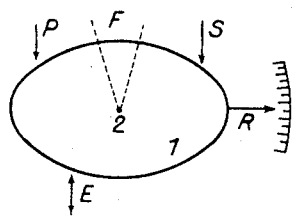
Fig. 2
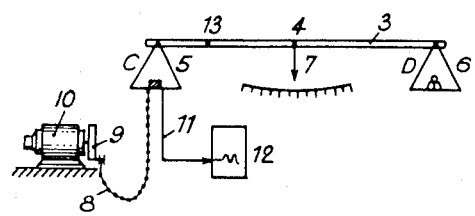
Fig. 3a  Fig. 3b  Fig. 3c
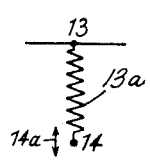 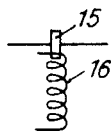 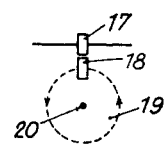
Fig. 3d  Fig. 3e  Fig. 3f
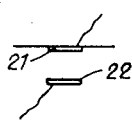 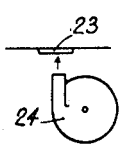 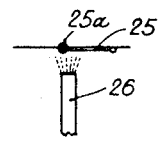
Fig. 3g  Fig. 4
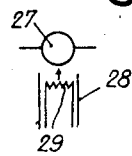 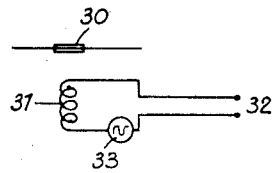
INVENTOR:
JEAN CARTON
BY:
Michael S. Striker
agt.

United States Patent Office 2,878,674
Patented Mar. 24, 1959

2,878,674

MEASURING AND DETECTING APPARATUS

Jean Carton, Paris, France

Application November 3, 1953, Serial No. 389,939

Claims priority, application France November 19, 1952

4 Claims. (Cl. 73—432)

It is well known that the general principle of the measuring (or detecting) of a physical quantity consists in providing in a suitable device an equilibrium between on the one hand forces which are a well defined and a function of a physical quantity involved and on the other hand suitable and known forces. As a rule, such a suitable device is subjected to a movement (or deformation) with respect to a stationary reference system, and usually, the state of equilibrium is indicated by a convenient reference means such as a pointer, pen, luminous beam or the like.

According to the concept underlying this invention, in such a measuring system the accuracy of the measurement indication as defined by the equilibrium condition in the apparatus is affected due to the frictional resistance forces obtaining when the system is at a rest as distinct from the friction forces that obtain when the parts are in motion. This invention is based upon the proposition that measurement indications eliminating such uncertainty or inaccuracy are attainable in a measurement indicating apparatus with the addition of vibrating devices applied and operated in a manner whereby the fault due to statical friction is eliminated. Accordingly, the apparatus of this invention may comprise a pivoted or pivot member turnable about a pivot means or fulcrum or the like for frictional turning movement about a respective turning axis, moving means for turning this pivot member which may be a lever or scale beam member movable about the turning axis in accordance with or to the extent of the measurement to be carried out, and vibrating means arranged for vibrating the turnable member while under the influence of the moving means, so that, as a result, the point of symmetry of the amplitude of the vibrations imparted to the pivot means will represent the true point of equilibrium indicative of the measurement sought to be determined.

In one embodiment of the invention, the measuring system comprises a balance beam subjected to vibrations or oscillations of suitable amplitude and frequency about the fulcrum point.

Features of the invention are found in various other embodiments of the means whereby the vibrations or oscillations may be imparted to the measuring and indicating system.

In the accompanying drawings:

Fig. 1 is a schematic representation of the indicating system subject to the rhythmic force applied in the manner and for the purpose of this invention;

Fig. 2 represents the invention diagrammatically as a weighing scale with rhythmically acting mechanical weighting means imparting the vibrations to the balance beam;

Fig. 3a shows a vibratory system applicable for the purposes of this invention, employing a spring;

Fig. 3b shows the vibratory system applicable for the purposes of this invention, comprising a solenoid coil;

Fig. 3c shows the vibratory system in the form of a non-electrical magnetic system;

Fig. 3d shows the vibratory system in another form, producing the vibrations through rhythmically changing electrostatic charges or potentials;

Fig. 3e shows the vibrating means in an embodiment employing an air blast of rhythmically varying intensity;

Fig. 3f shows the vibrating means employing rhythmically varying thermal effects producible by a flame;

Fig. 3g shows vibrating means thermally actuated by an electric resistance heating coil and an air stream heated thereby;

Fig. 4 shows the vibrations produced electrically as by alternating current superposed upon the current to be measured.

In its broadest embodiment, the movable portion of the suitable device may be diagrammatically illustrated as shown in Fig. 1, by a solid body having a boundary surface 1 and adapted to rotate about an axis indicated as at 2.

This solid body is subjected on the one hand to the action of the quantity or weight or force P to be measured (or detected) and on the other hand to the action of known forces S. An indicating system R makes it possible to determine the statical equilibrium of the system and therefore the exact relationship between the quantity to be measured and the known comparator quantities.

In practice, the relative motion of the movable or turnable solid body with respect to stationary structure creates ill-defined friction forces, and it is known that these forces tend to hinder the movement when the correct equilibrium position is sought.

The equation of static equilibrium, that is to say the equation which is fulfilled after any movement is stopped, therefore comprises not only forces P and S but also unknown friction forces F which may be considered as a torque about the axis 2. The magnitude of this torque is unknown and may vary from one test to another.

It is well known that the two basic features of the quality of a measuring apparatus, namely accuracy and sensitivity, are constantly depending on the friction forces, and the skill of the manufacturers is always directed toward obtaining a reduction of these friction forces.

Such a reduction of frictional effects, however, may be obtained only by a higher degree of manufacturing accuracy and by the introduction of materials and devices the cost and the intricacy in the use of which soon bring about a limitation as to their application.

In this respect, therefore, it seems that at present a practical limit has been reached concerning the degree of accuracy obtainable in trying to establish a statical equilibrium of forces, in using observations or indications where the system is at rest.

It is the novel and unexpected feature of the present invention to have discovered that the accuracy and the sensitivity of the measuring or indicating apparatus may be considerably improved by achieving dynamical equilibrium of forces rather than a statical equilibrium.

To illustrate the manner in which this statical equilibrium is attainable, reference may be had to the apparatus diagrammatically shown in Fig. 1, it being assumed that a statical equilibrium has first been reached in this apparatus.

The movable body is then subjected to the continuous action of a weak reciprocating force E giving rise to a torque with respect to the axis 2, so as to cause the apparatus to oscillate about its statical equilibrium position.

Generally speaking, the force E may be represented by the equation $E = f(t) + A$, wherein $f$ is a periodical function of the time $t$ and $A$ a constant (which may be equal to zero). Then, in order to better observe the oscillations, the resulting oscillations may be charted by means of a pointer upon a recording cylinder of any known type. It is found that the oscillations become very soon regular and that an axis of symmetry will be established representing a position of dynamical equilibrium of the oscillating body. Should this test be stopped and resumed even after long intervals of time, provided that the test conditions remain the same it is found that the same position of dynamical equilibrium is established with the same accuracy, which is an essential feature of the measuring apparatus of this invention.

However, another unexpected result resides in the fact that even a slight modification in the value of the quantity P causes the axis of symmetry of the oscillation to be shifted by quite a material distance. This shifting of the point of symmetry may still be perceived for a variation in the quantity P which would be quite incapable of moving the apparatus should the latter be at rest. The sensitivity of this apparatus is thus improved to a considerable extent.

The origin of such unexpected results may be traced by a careful study of the proper nature of the friction forces, or more exactly of the main friction forces involved in the sliding engagement between solids.

In fact, in the broad formula of the sliding friction $F=K.N$, wherein F is the friction force component which opposes the movement, N the normal component of the pressure exerted between the two bodies involved in the equilibrium and K a factor depending on the nature of the contacting friction surfaces, it should be noted that F is independent of the area of the contacting surfaces and of the relative speed between such surfaces. The amount of friction thus remains unchanged regardless of the relative speed of the sliding bodies and its value is definitely determined at any moment during the movement. But at the moment the relative speed has a zero value, the friction force becomes indefinite. It then has a value in a range between zero and a maximum somewhat above F since friction at rest is, as a rule, somewhat higher than friction during motion and nothing is known but that its main component is positioned somewhere in the so-called friction angle or cone.

From these broad considerations confirmed by a great number of tests the following conclusion may be reached: in any statical equilibrium of forces of this nature there will always remain an indefiniteness due to the value of friction at rest. Accordingly, the accuracy and the sensitivity of the apparatus will be, as a rule, erratic when this apparatus is used at rest.

Yet, when the system is in motion, and as in the present case in continuous oscillation, the sliding friction forces build up always in the same manner and they depend effectively on N only. Since these forces exert their effects in a regular manner and in a direction which is clearly defined, it will then be understood why a permanent rate of regular oscillation may be obtained, should an alternating force E such as herein above defined be applied to maintain this oscillatory motion.

It should be noted that in the proposed method what is sought for is not the measurement (or the comparison) of the extent of the oscillations but only the position of their symmetry axis.

Using this method, which constitutes an important improvement of the present invention, the determination of an average of a great number of points is thus automatically substituted for the determination of a few points. The sensitivity of the measurement or of the indication is thus also increased for the reason that the influence of casual errors is considerably reduced.

Generally speaking, in order to apply the mode of operation above described, it is sufficient, in the neighbourhood of the statical equilibrium position (obtained by a suitable application before hand or concomitantly of the known force S) to apply to the measuring apparatus a periodical force E the nature and the amplitude of which are chosen in order to impress upon said system symmetrical continuous oscillations about its position of equilibrium with an amplitude sufficient to cause said system to operate outside of the friction cone, the desired position of equilibrium being thus defined by the axis of symmetry of said oscillations.

It should be noted that it has been already proposed to impress periodical asymmetrical vibrations of a very small amplitude upon a system of this kind, but such vibrations are unable to ensure the desired result because of their asymmetry with respect to the position of equilibrium of the system and because of the amplitude of said vibration is not sufficient to cause the system to operate outside of the friction cone.

The nature of this force may vary between wide limits and it is generally sufficient that it may be rhythmically controlled and that its action transferred (through the links) to the movable apparatus does not interfere with the relative movement of the latter. Consequently, any power, be it mechanical, kinetic, gravitational, elastic, chemical, electrical, etc., that fulfills these requirements may be applied either directly to the movable apparatus to develop the oscillation required, or indirectly to the forces P and/or S.

For instance, in measuring or detecting an electrical quantity P such as a direct current, it may prove more convenient to superimpose an alternating current E of suitable frequency to the electrical quantity P, rather than applying E to a device adapted to convert alternating electric power into oscillatory mechanical motion.

The above in connection with the principle of the invention and the means for putting it into practice, clearly shows the reason why the empirical method which consists, for "sensitivating" a measuring apparatus placed on a table, in knocking more or less sharply upon the table during the measuring process, is likely to yield only erratic and always more or less deceiving results and may cause the apparatus to be damaged. In fact, first of all, the impulse may be transferred from the table to the movable element only through very weak parts such as bearings, pivots, pins and knife edges. Then, even assuming that it is accepted systematically to resort to such mechanical knocks to move the movable parts, it should be appreciated that such an action is not adjustable and furthermore is subject to very quick damping. The conditions are therefore not at all those of a particular movement with permanent oscillations. Finally, the absence of regular oscillations does not make it possible to use the localizing method based upon the axis of symmetry which affords a matchless accuracy and easiness of operation.

These two operating processes are thus quite different in their spirit and in their practical application.

After having described the invention in its broadest aspect, it is particularly interesting to explain its application to a typical though not restrictive example, namely a balance.

Fig. 2 shows a balance of a conventional type, diagrammatically illustrated by its main elements, namely a beam or pivot member 3 pivotally mounted on a pin shown as at 4 and two dishes 5 and 6. A pointer 7 operatively connected to the beam is adapted for localizing the equilibrium position. Most often, it is desired to measure the weight P of a body C placed on one of the dishes, namely, dish 5. To this aim, known weights D are placed on the other dish 6 until the equilibrium is secured, a condition which may be ascertained by means of the pointer 7.

It is a well known fact that the friction forces exerted mainly upon the suspension knife edge of the balance, which materializes the oscillation axis 4, considerably interfere with the two essential features of the apparatus, namely accuracy and sensitivity. Many improvements have been devised from the mechanical point of view, in order to improve these features.

Instead of waiting for the beam to occupy a position of statical equilibrium, a slight symmetrical oscillation is permanently imparted to the beam, according to the invention. The manner in which these oscillations are effected may vary between wide limits as indicated hereunder.

In a first embodiment, one end of a small chain 8 is attached to the under face of the dish 5 whereas the other end thereof is connected to a crank 9, rotatively driven by a motor 10. A continuous rotational movement of the motor 10 causes the adjacent end of the chain to be alternately raised and lowered by a given length. When the raising and lowering motion is suitably timed, a pulsatory mechanical gravitational force is secured which has the same frequency and which is applied to the end of the beam.

The varying symmetrical force thus introduced has for its maximum value approximately half the weight of a length of chain equal to the stroke of the end thereof that is not secured to the beam. The mechanical energy thus imparted to the beam should be slightly in excess of the maximum energy of the friction forces of the various elements of the balance, in the course of an angular movement of the beam of a very small extent.

The recording of the oscillations is effected by means of any conventional contrivance, for instance a tracer 11 operatively connected to the dish 5 and a recording cylinder diagrammatically illustrated as at 12.

It is found that the balance regularly oscillates between two limits the medium position of which represents the position of equilibrium. It is then seen that the latter is well defined and that it varies to a material and consistent extent as soon as an additional weight is placed at C, the magnitude of which is only one hundredth of the magnitude of the weight which should be placed at C to modify the position of the beam starting from the statical equilibrium. This extraordinary and unexpected increase in the sensitivity (combined with a great accuracy) thus constitutes the basic result of the invention, without the necessity of resorting to expensive, intricate devices always delicate to handle.

For introducing the additional permanent oscillating power, many embodiments or examples of vibrating means may be given some of which are presented below without however in any way restricting the underlying scope of the invention.

According to Fig. 2, the energy E is applied to the beam 3 of the weighing scale representing the measuring apparatus at a point indicated as at 13, but in practice it may be applied to any desirable location in the apparatus.

In Fig. 3a, a spring 13a is shown, one end of which is attached at 13 to the movable or turnable member, the other end being secured as at 14 to a device producing a reciprocating motion.

In Fig. 3b, a permanent magnet 15 is secured at 13 to the movable or turnable member. This magnet is attracted or repulsed by an electromagnetic action obtainable from an electric current having a suitable frequency and being circulated through a coil 16.

The same result is obtained when the magnet is substituted for the coil and vice versa, or further by substituting soft iron for the permanent magnet.

In Fig. 3c, the additional energy E is rhythmically introduced by the reciprocating action of a magnet 17 secured at 13 to the movable or turnable member and another magnet 18 carried by a wheel indicated at 19 adapted to rotate about an axis 20 and thus periodically acting upon the magnet 17.

In Fig. 3d, an insulated metal plate 21 is secured at 13 to the movable or turnable member while another metal plate 22 is arranged facing the plate 21, thus forming a capacitor. When subjecting the plates to an alternating differential of potential, an alternating or rhythmically changing attracting force of an electrostatic nature is thereby obtained.

In the modification shown in Fig. 3e, which shows the direct action of a fluid, the additional energy E is obtained from an airblast delivered for instance by a suitable turbine 24 and impinging against a plate 23 carried by the beam. The pulsating characteristic of the airblast is obtained by any conventional means such as for instance a rhythmic obturation or deflection or the airjet from the turbine.

In Fig. 3f, use is made of the thermal expansion of a body or a substance. In this example a tube 25 similar to a mercury thermometer with a very thin conduit, is attached to the beam. A flame (or any suitable heat source) 26 rhythmically heats up the tube causing the expansion of the mercury to vary, which results in quick and rhythmic variations of the position of the center of gravity of the tube and consequently that of the beam.

It is well understood that in order to ensure, according to the essential feature of the invention, the symmetry of amplitude of the oscillations impressed upon the beam by the displacement of the center of gravity, the periodical heating and the cooling of the mercury must follow similar laws of rhythmic application.

An aerostatic and aerodynamic action is used in the arrangement of Fig. 3g to produce the oscillations, which shows: a ball 27 secured to the beam and subjected to the hydrostatic thrust from the stream of air supplied by an enclosure or duct 28 heated for instance by an electric resistor 29 in which an alternating current with a suitable frequency is circulated. The variation in the specific weight of the air due to variations in the heating intensity results in a concomitant variation in the hydrostatic and hydro-pneumatic thrust exerted upon the ball 27.

The considerations put forward above with reference to Fig. 3f concerning the manner in which rhythmic heating and cooling must be applied are also valid with respect to the embodiment shown at Fig. 3g.

Fig. 4 shows a modification of the device illustrated in Fig. 3b. An electric current 32 is measured by circulating this current in an attracting coil 31 and by superimposing on said current an alternating current supplied by the source 33. It is the resulting force that acts upon the beam but the position of equilibrium is a function of the value of the current 32.

What I claim is:

1. In a measuring apparatus or the like, in combination, pivot means mounted for frictional turning movement about a turning axis; moving means connected to said pivot means for turning the same about said turning axis an angular distance dependent upon the measurement or the like to be carried out; and a gravitational vibrating device for vibrating said pivot means with substantially equal amplitude irrespective of the position of said pivot means within predetermined limits, whereby said pivot member will turn about said turning axis under the influence of said moving means despite the friction, said gravitational vibrating device including a driving mechanism for cyclically raising and lowering a carrier element between an uppermost and lowermost position, and an elongated flexible weight member connected at one free end thereof to one of said means and at the other free end thereof to said carrier element so that said elongated flexible weight member may hang freely from said one means and from said carrier element whereby different fractions of the weight of said elongated flexible weight member will be supported by said one means and consequently by said pivot means as said carrier element is moved through its different positions between said uppermost and lowermost positions thereof so that said pivot means will be oscillated about said turning axis during raising and lowering of said carrier element between said uppermost and lowermost positions thereof by said driving mechanism.

2. In a measuring apparatus or the like, in combination, pivot means mounted for frictional turning movement about a turning axis; moving means connected to said pivot means for turning the same about said turning axis an angular distance dependent upon the measurement or the like to be carried out; and a gravitational vibrating device for vibrating said pivot means with substantially equal amplitude irrespective of the position of said pivot means within predetermined limits, whereby said pivot member will turn about said turning axis under the influence of said moving means despite the friction, said gravitational vibrating device including driving means for cyclically raising and lowering a carrier element between an uppermost and lowermost position, and an elongated chain member connected at one free end thereof to said moving means and at the other free end thereof to said carrier element so that said elongated chain member may hang freely from said moving means and from said carrier element whereby different fractions of the weight of said elongated chain member will be supported by said moving means and consequently by said pivot means as said carrier element is moved through its different positions between said uppermost and lowermost positions thereof so that said pivot means will be oscillated about said turning axis during raising and lowering of said carrier element between said uppermost and lowermost positions thereof by said driving means.

3. The combination defined in claim 2 wherein said driving means includes a disc member mounted for rotation about a substantially horizontal axis of rotation and motor means for rotating said disc member about said axis of rotation, and wherein said carrier element is eccentrically mounted on said disc member so that said carrier element is cyclically raised and lowered during rotation of said disc member by said motor means about said axis of rotation.

4. In a measuring apparatus or the like, in combination, pivot means mounted for frictional turning movement about a turning axis; moving means connected to said pivot means for turning the same about said turning axis an angular distance dependent upon the measurement or the like to be carried out; and a gravitational vibrating device for vibrating said pivot means with substantially equal amplitude irrespective of the position of said pivot means within predetermined limits, whereby said pivot member will turn about said turning axis under the influence of said moving means despite the friction, said gravitational vibrating device including driving means for cyclically raising and lowering a carrier element between an uppermost and lowermost position, and an elongated weight member connected at one free end thereof to said pivot means and at the other free end thereof to said carrier element so that said elongated weight member may hang freely from said pivot means and from said carrier element whereby different fractions of the weight of said elongated weight member will be supported by said pivot means as said carrier element is moved through its different positions between said uppermost and lowermost positions thereof so that said pivot means will be oscillated about said turning axis during raising and lowering of said carrier element between said uppermost and lowermost positions thereof by said driving mechanism.

References Cited in the file of this patent

UNITED STATES PATENTS

| | | |
|---|---|---|
| 654,103 | Schrottke | July 17, 1900 |
| 1,487,402 | Roucka | Mar. 18, 1924 |
| 1,600,071 | Shaifer | Sept. 14, 1926 |
| 1,638,101 | Roucka | Aug. 9, 1927 |
| 1,638,102 | Roucka | Aug. 9, 1927 |
| 2,047,203 | Henson | July 14, 1936 |
| 2,305,783 | Heymann et al. | Dec. 22, 1942 |
| 2,489,776 | Hooper | Nov. 29, 1949 |
| 2,557,092 | Garbarani | June 19, 1951 |
| 2,635,463 | Pouradier | Apr. 21, 1953 |
| 2,717,151 | Carton | Sept. 6, 1955 |
| 2,739,803 | Carton | Mar. 27, 1956 |

FOREIGN PATENTS

| | | |
|---|---|---|
| 185,905 | Germany | Apr. 29, 1907 |